United States Patent
Kangude et al.

(10) Patent No.: US 9,516,580 B2
(45) Date of Patent: Dec. 6, 2016

(54) ENABLING DOWN LINK RECEPTION OF SYSTEM AND CONTROL INFORMATION FROM INTRA-FREQUENCY NEIGHBORS WITHOUT GAPS IN THE SERVING CELL IN EVOLVED-UTRA SYSTEMS

(75) Inventors: Shantanu Kangude, Dallas, TX (US); Pierre Bertrand, Antibes (FR); Badri N. Varadarajan, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 2515 days.

(21) Appl. No.: 12/048,777

(22) Filed: Mar. 14, 2008

(65) Prior Publication Data

US 2008/0233960 A1 Sep. 25, 2008

Related U.S. Application Data

(60) Provisional application No. 60/895,633, filed on Mar. 19, 2007.

(51) Int. Cl.
| | |
|---|---|
| *H04L 5/00* | (2006.01) |
| *H04W 48/12* | (2009.01) |
| *H04L 27/26* | (2006.01) |
| *H04W 56/00* | (2009.01) |

(52) U.S. Cl.
CPC ............ *H04W 48/12* (2013.01); *H04L 5/0007* (2013.01); *H04L 27/2613* (2013.01); *H04W 56/00* (2013.01)

(58) Field of Classification Search
CPC ... H04L 27/2613; H04L 5/0007; H04W 48/12; H04W 56/00
USPC .. 455/436, 466, 550.1, 456.2, 437; 370/331, 328, 329, 310, 335, 352, 338
See application file for complete search history.

(56) References Cited

U.S. PATENT DOCUMENTS

| | | | | |
|---|---|---|---|---|
| 5,710,974 A | * | 1/1998 | Granlund et al. | 455/436 |
| 6,101,176 A | * | 8/2000 | Honkasalo | H04B 7/2618 370/335 |
| 6,304,560 B1 | * | 10/2001 | Archambaud | H04B 7/155 370/324 |
| 6,434,367 B1 | * | 8/2002 | Kumar | H04W 52/143 370/331 |
| 6,438,117 B1 | * | 8/2002 | Grilli | H04W 36/0083 370/331 |
| 6,493,332 B1 | * | 12/2002 | Hirade | H04W 16/06 370/342 |
| 6,496,531 B1 | * | 12/2002 | Kamel | H04W 52/50 375/130 |
| 6,757,270 B1 | * | 6/2004 | Kumar | H04W 52/12 370/342 |
| 6,771,622 B1 | * | 8/2004 | Banerjee | 370/331 |

(Continued)

OTHER PUBLICATIONS

"Overview of Uplink Intra and Inter Cell Power Control", 3GPP TSG RAN1 #47-bis, R1-070441, Qualcomm Europe, NTT DoCoMo, Sorrento, Italy, Jan. 15-19, 2007, pp. 1-3.

(Continued)

*Primary Examiner* — Khaled Kassim
(74) *Attorney, Agent, or Firm* — Ronald O. Neerings; Frank D. Cimino

(57) ABSTRACT

Simplified communication between user equipment and a neighboring cell not the primary cell is achieved by restricting the transmission parameters, such as bandwidth, of the neighboring cell transmission and provision of a simplified secondary baseband processor in the user equipment.

14 Claims, 4 Drawing Sheets

(56) References Cited

U.S. PATENT DOCUMENTS

| | | | |
|---|---|---|---|
| 7,200,139 B1* | 4/2007 | Chu | H04L 29/06027 370/352 |
| 7,876,729 B1* | 1/2011 | Grilli | H04W 36/14 370/332 |
| 8,483,105 B2* | 7/2013 | Nanda | H04L 29/06068 370/278 |
| 2001/0040874 A1* | 11/2001 | Saito | H04B 1/71072 370/282 |
| 2002/0034950 A1* | 3/2002 | Sawada | H04W 16/32 455/446 |
| 2002/0191569 A1* | 12/2002 | Sung | H04J 13/00 370/335 |
| 2003/0013452 A1* | 1/2003 | Hunt | H04W 16/32 455/449 |
| 2003/0119550 A1* | 6/2003 | Rinne | H04W 36/30 455/553.1 |
| 2003/0129982 A1* | 7/2003 | Perini | H04W 36/18 455/442 |
| 2003/0162535 A1* | 8/2003 | Nishiyama et al. | 455/422 |
| 2004/0023693 A1* | 2/2004 | Okawa | H04W 36/12 455/562.1 |
| 2004/0127220 A1* | 7/2004 | Proctor, Jr. | H04W 36/18 455/442 |
| 2004/0153700 A1* | 8/2004 | Nixon | G05B 9/03 714/4.1 |
| 2005/0124344 A1* | 6/2005 | Laroia et al. | 455/436 |
| 2005/0124345 A1* | 6/2005 | Laroia et al. | 455/437 |
| 2005/0201331 A1* | 9/2005 | Gaal et al. | 370/332 |
| 2006/0019664 A1* | 1/2006 | Nelakanti | H04W 36/14 455/436 |
| 2006/0229103 A1* | 10/2006 | Monk | H04B 7/18506 455/562.1 |
| 2007/0094374 A1* | 4/2007 | Karia | H04L 29/06027 709/223 |
| 2007/0173256 A1* | 7/2007 | Laroia et al. | 455/436 |
| 2008/0032693 A1* | 2/2008 | Ozluturk | H04W 36/18 455/436 |
| 2008/0268849 A1* | 10/2008 | Narasimha | H04W 36/0077 455/437 |
| 2008/0298275 A1* | 12/2008 | De Sousa | 370/255 |
| 2009/0168662 A1* | 7/2009 | Tsuboi | H04L 1/20 370/252 |
| 2010/0014488 A1* | 1/2010 | Kitahara | H04W 72/0446 370/336 |
| 2010/0273486 A1* | 10/2010 | Kharia et al. | 455/436 |

OTHER PUBLICATIONS

"Open-Loop Inter Cell Power Control for EUTRA", 3GPP TSG RAN WG1 #48, R1-070742, Texas Instruments, St. Louis, US, Feb. 12-18, 2007, pp. 1-5.

"Transmission Power Control in E-UTRA Uplink", 3GPP TSG RAN WG1 Meeting #48, R1-070870, NTT DoCoMo, NEC, Panasonic, Sharp, Toshiba Corporation, St. Louis, US, (Original R1-070106), Feb. 12-16, 2007, pp. 1-8.

"Transmission Power Control in E-UTRA Uplink", 3GPP TSG RAN WG1 Meeting #48, R1070870, NTT DoCoMo, NEC, Panasonic, Sharp, Toshiba Corporation, St. Louis, USA, Feb. 12-16, 2007, pp. 1-8.

"Evaluation on the Power Control of Uplink Shared Data Channel", TSG-RAN WG1 #48, R1-070928, LG Electronics, St. Louis, US, Feb. 12-16, 2007, 3 pages.

"Fractional Power Control Using Pilot Power Ratio Measurements for the E-UTRA Uplink", 3GPP TSG-RAN WG1 #48, R1-071074, Alcatel-Lucent, St. Louis, US, Feb. 12-16, 2007, 11 pages.

"Evolved Universal Terrestrial Radio Access (E-UTRA) and Evolved Universal Terrestrial Radio Access Network (E-UTRAN)", Overall description, Stage 2 (Release 8), 3GPP TS 36.300, vol. 9.0, (Mar. 2007), pp. 1-88.

"Optimized HO Method for Reducing Latencies in UL Synchronization and Initial UL Allocation in E-UTRA", 3GPP TSG RAN WG2 Meeting #57 bis, R2-071269, St. Julians, Malta, Mar. 26-30, 2007, 8 pages.

"3rd Generation Partnership Project; Technical Specification Group Radio Access Network; Physical Channels, and Modulation (Release 8)", 3GPP TS 36.211, vol. 4.2, Feb. 2007, pp. 1-35.

* cited by examiner

US 9,516,580 B2

ENABLING DOWN LINK RECEPTION OF SYSTEM AND CONTROL INFORMATION FROM INTRA-FREQUENCY NEIGHBORS WITHOUT GAPS IN THE SERVING CELL IN EVOLVED-UTRA SYSTEMS

CLAIM OF PRIORITY

This application claims priority under 35 U.S.C. 119(e)(1) to U.S. Provisional Application No. 60/895,633 filed Mar. 19, 2007.

TECHNICAL FIELD OF THE INVENTION

The technical field of this invention is wireless telephone communication, particularly Evolved-UMTS Radio Access (E-UTRA) communication.

BACKGROUND OF THE INVENTION

As wireless systems proliferate, the expanding user base and the demand for new services necessitate the development of technologies capable of meeting users' ever increasing expectations. Users of mobile telecommunications devices expect not only globally available reliable voice communications but a variety of data services, such as email, text messaging and internet access.

SUMMARY OF THE INVENTION

Reception of relevant down link (DL) transmissions in neighboring cells by a mobile UE fully connected in a serving cell requires significant additional circuitry if no structure is imposed on the DL transmissions in Orthogonal Frequency Division Multiple Access (OFDMA) based E-UTRA systems. This invention includes some structure and format for relevant DL transmissions to aid in dual reception with minimal implementation complexity.

This invention is an E-UTRA protocol such that UEs connected in a cell can decode some of the transmissions from neighboring cells' without gaps and with minimum implementation complexity. This invention is similar to a synchronization channel and a broadcast channel (BCH) which are limited to 1.25 MHz bandwidth, the first block in dynamic-BCH (D-BCH) and random access channel (RACH) response messages 2 and 4 are transmitted in bandwidth limited regions. This invention also includes separately encoding the allocations for the first D-BCH block and the RACH responses. These are the foremost allocations in the L1-L2 control channel.

This invention provides a minimal protocol performance compromise for significant reduction in implementation complexity. This invention enables DL reception in neighbors without gaps in the current cell and with minimal additional circuitry compared to simply receiving one cell.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
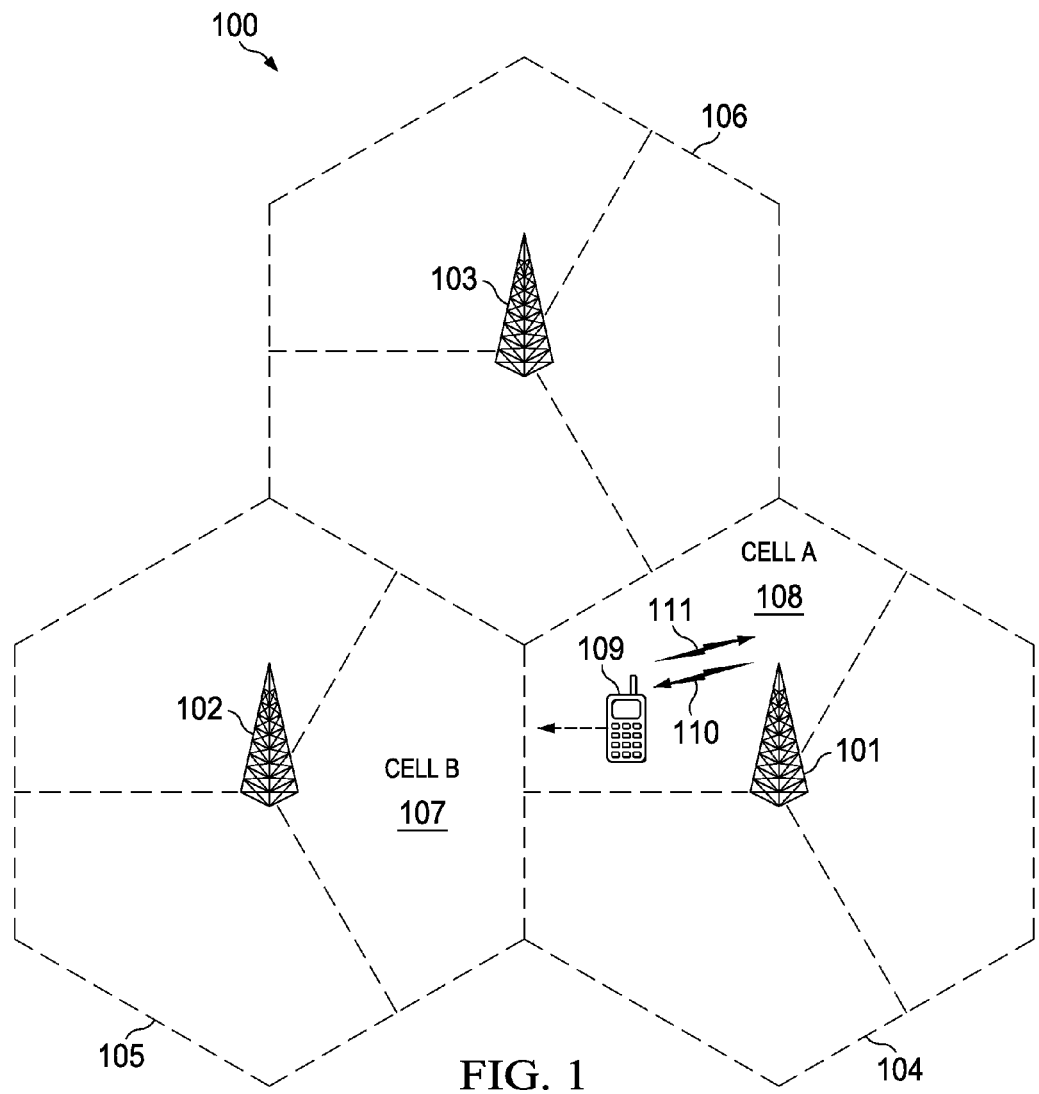
FIG. 1 is a diagram of a communication system of the present invention having three cells.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UE's data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Figure 2:
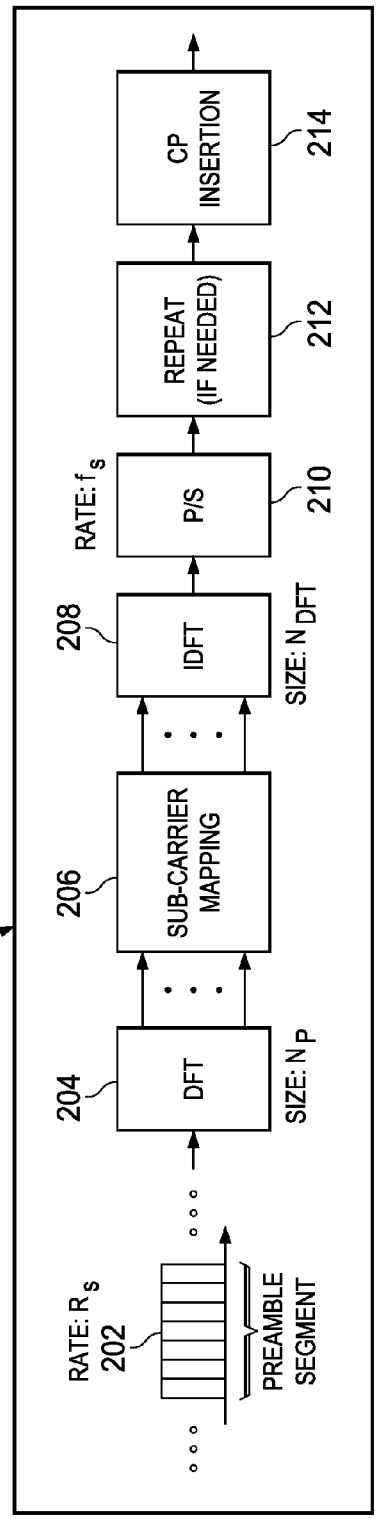
FIG. 2 is a block diagram of a transmitter of the present invention.

FIG. 2 is a block diagram of a wireless transmitter 200 of the present invention for transmitting a preamble 202 to a remote receiver. The preamble is preferably a CAZAC sequence for generating the random access preamble signal. CAZAC sequences are complex valued sequences with following two properties: 1) Constant Amplitude (CA), and 2) Zero Cyclic Autocorrelation (ZAC). Examples of CAZAC sequences include but are not limited to: Chu Sequences; Frank-Zadoff Sequences; Zadoff-Chu (ZC) Sequences; and Generalized Chirp-Like (GCL) Sequences.

Zadoff-Chu (ZC) sequences are defined by:

$$a_M(k) = \exp[j2\pi(M/N)[k(k+1)/2+qk]] \text{ for N odd}$$

$$a_M(k) = \exp[j2\pi(M/N)[k^2/2+qk]] \text{ for N even}$$

where: N is the length of the sequence; M is the index of the root ZC sequence with M and N being relatively prime; q is any fixed integer; and k is the index of the sequence element ranging from 0 to N−1. These are representative examples of CAZAC sequences. An alternative convention for ZC definition replaces j in the above formula by −j. Either convention can be adopted. In the above formula, making N a prime number maximizes the set of non-orthogonal root ZC sequences having optimal cross-correlation. When N is prime, there are (N−1) possible choices for M. Each such choice results in a distinct root ZC CAZAC sequence. In this application the terms Zadoff-Chu, ZC and ZC CAZAC will be used interchangeably. The term CAZAC denotes any CAZAC sequence, ZC or otherwise.

In a preferred embodiment of the invention, random access preamble signal 202 is constructed from a CAZAC sequence, such as a ZC sequence. Additional modifications to the selected CAZAC sequence can be performed using any of the following operations: multiplication by a complex constant, Discrete Fourier Transform (DFT), inverse Discrete Fourier Transform (IDFT), Fast Fourier Transform (FFT), inverse Fast Fourier Transform (IFFT), cyclic shifting, zero padding, sequence block repetition, sequence truncation, sequence cyclic extension and others. In the preferred embodiment of the invention, UE 200 selects random access preamble signal 202, by selecting a CAZAC sequence and optionally modified as noted above. DFT circuit 204 receives the modified CAZAC sequence to produce a frequency domain signal. Sub-carrier mapping circuit 206 receives the frequency domain signal. Sub-carrier mapping circuit maps the preamble to user selected tones. IDFT circuit 208 then converts the user selected tones to a time domain signal which is supplied to parallel-to-serial converter 210. The resulting preamble is optionally repeated by repeat circuit 212 to achieve the desired duration. Cyclic prefix (CP) circuit 214 adds a cyclic prefix to the preamble before transmission to a remote receiver.

Figure 3:
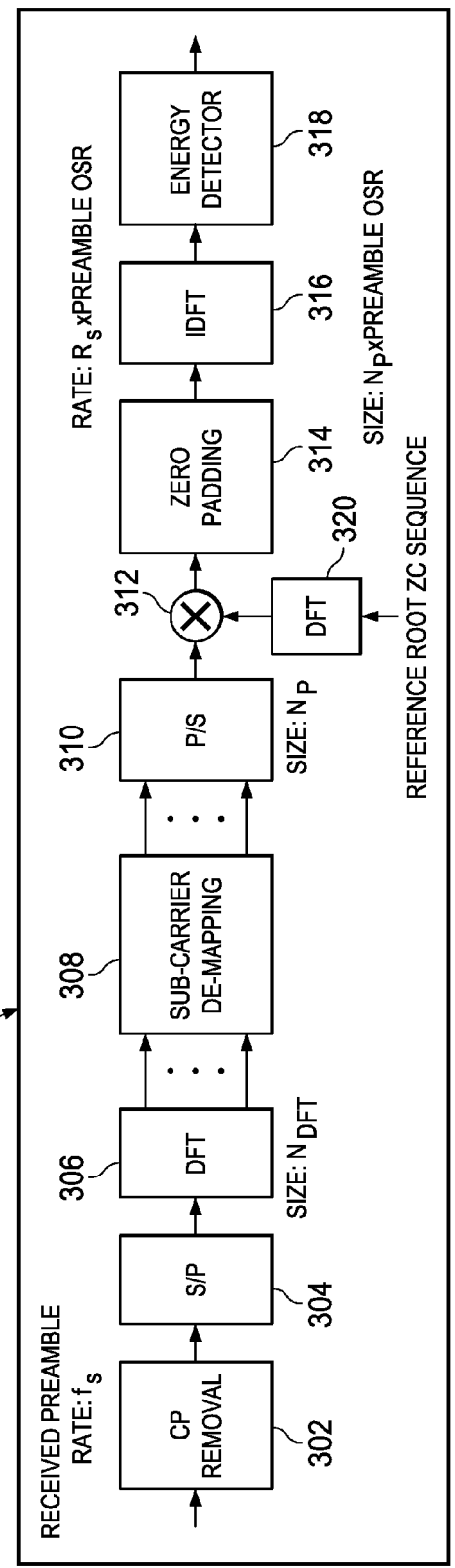
FIG. 3 is a block diagram of a receiver of the present invention.

FIG. 3 is a block diagram of an embodiment of a random access channel receiver 300 of the present invention. CP removal circuit 302 removes the cyclic prefix from the received random access signal. Serial-to-parallel converter 304 converts the resulting preamble into a parallel signal. DFT circuit 306 produces sub-carrier mapped tones from the parallel preamble components. Sub-carrier de-mapping circuit 308 demaps the mapped tones. These demapped tones are equivalent to the output signal from DFT circuit 204 of transmitter 200 (FIG. 2). Parallel-to-serial circuit 310 converts the parallel demapped tones into a serial data stream. Product circuit 312 receives this serial data stream and a reference root sequence from DFT circuit 320. Product circuit 312 computes a tone by tone complex multiplication of demapped tones with the reference tones. Zero padding circuit 314 adds a number of zeros necessary to produce a correct sequence length. IDFT circuit 316 converts the multiplied frequency tones into time domain signals. These time domain signals include concatenated power delay profiles of all cyclic shift replicas of the preamble root sequence. Energy detector circuit 318 detects the energy in the time domain signals. This identifies the received preamble sequences by detecting the time of peak correlation between received random access preamble signals and the reference ZC root sequence.

Figure 4:
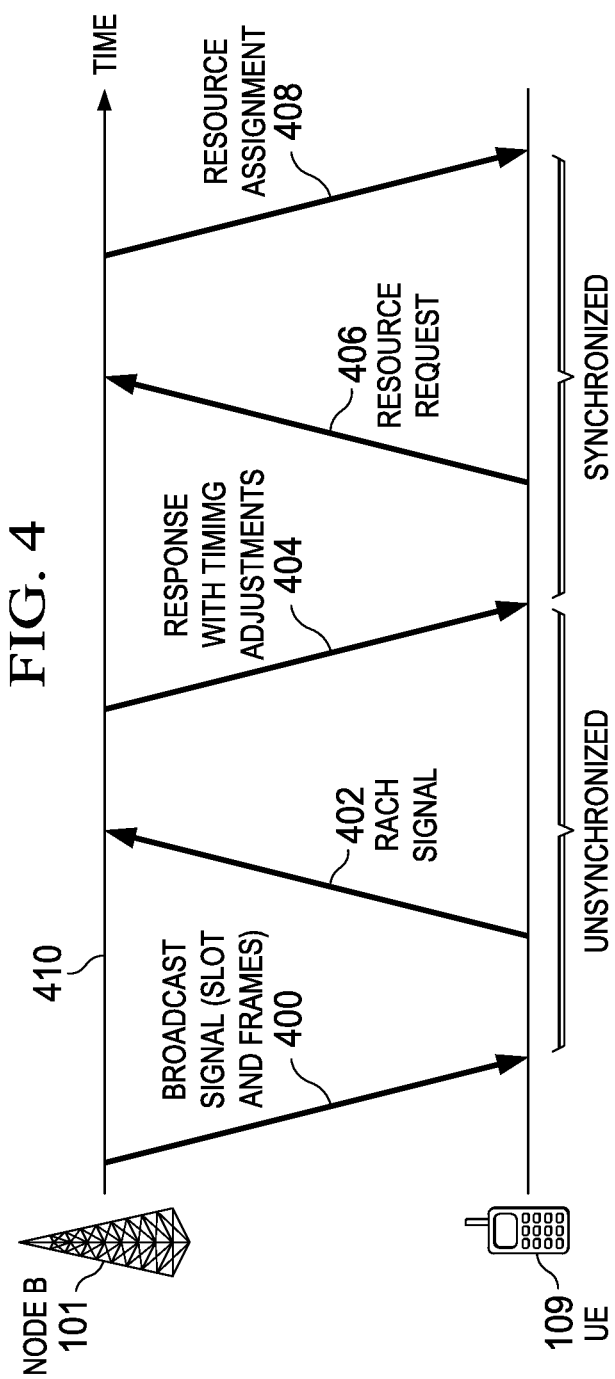
FIG. 4 is a diagram showing a procedure for establishing communications between user equipment (UE) and a base station (Node B)

FIG. 4 illustrates the procedure for establishing communications via the RACH between UE 109 constructed as illustrated in FIG. 2 and a Node B 101 as illustrated in FIG. 3. The horizontal arrow of time 410 illustrates the following sequence. Node B 101 periodically transmits a broadcast signal 400 within the cell having slot and frame timing information for UE 109. UE 109 selects an appropriate CAZAC sequence and produces a preamble with appended cyclic prefix as described above. UE 109 transmits this preamble 402 over the RACH to Node B 101. Node B 101 identifies the preamble and responds with timing adjustments 404 to synchronize communications and adjust for transmit delay. Once synchronized with Node B 101, UE 109 transmits communication resource request 406. Alternatively, the communication resource request might be included as part of RACH signal 402. Node B 101 then transmits communication resources assignment 408 to UE 109. Synchronous communication can then begin over the primary user channel.

One important capability of UE 109 is the ability to receive and decode simultaneously from multiple cells. This ability is important for making measurements or reading selected data from neighboring cells while remaining fully connected to the primary cell. Given the complexities and cost of additional circuitry within UE 109, including an additional RF or an additional baseband receiver within UE 109 is not efficient. The majority of the time these additional circuits will not be used. If no additional circuitry than that required for the primary cell reception is provided, communication may still be possible with certain limitations in protocol design. For example, in asynchronous networks gaps in connectivity with the primary cell is necessary to enable any reception from neighboring cells. There are various reasons why UE 109 may want to receive from neighboring cells, while maintaining full communication with the primary cell. These reasons generally do not require UE 109 to be able to receive the neighboring cell transmissions over the entire bandwidth with full reception capability as in the primary cell. For example, UE 109 may only need to receive certain limited channels such as broadcast channel (BCH) from the neighboring cells. Including additional circuitry in UE 109 for such limited additional reception may not be as prohibitive as additional circuits for full duplex reception. It is thus advantageous to design a protocol requiring minimal complexity in UE 109 for such neighbor reception without gaps in the reception from the primary cell.

This invention gives some structure to the various DL transmissions in the protocol, so that UEs 109 connected to intra-frequency neighboring cells can receive the relevant information without gaps in reception form their primary cell and with minimum additional complexity. There a numerous examples of DL information of interest to UE 109 of neighboring cells. UE 109 while fully connected to a first cell may need to make measurements about neighboring cells to aid in fast handovers (HO) and cell selection/reselection. These measurements may be very basic such as received power levels and may require reading the synchronization channel (SCH). Specific system information in addition to the power level measurements may be required for HOs such as system frame numbers (SFN). Below, we list how reading some system information and RACH responses of a neighbor might be beneficial for a UE connected to a cell.

UE 109 connected to a cell may receive some of the system parameters of neighboring cells from the current cell itself. However, any parameter that changes so frequently as to require regular monitoring is best read from the neighboring cell directly. Certain parameters/characteristics of cell change with a known pattern. For example the SFN always increases sequentially with every sub-frame. However, in order to know the current or future values of such parameters, it is necessary for UE 109 to synchronize with a base value by reading directly from the neighboring cell. Reading system information directly from the neighboring cell may be advantageous to reduce the overhead of reporting in the DL-SCH of the current cell.

The main reasons to read a neighbor cell's system information directly in its DL are: the information changes very frequently; the UE 109 must synchronize with a current base value of a changing parameter; and it is advantageous to save the overhead of individually transmitting system information to every UE 109 via the current cell. Some parameters that are advantageously read from the DL transmissions of system information are SFN, power control parameters and RACH parameters. Some of these may be included in primary-BCCH (P-BCCH) and transmitted in the BCH. At least a few of these parameters may also be transmitted in blocks in a dynamic-BCH (D-BCH). The D-BCH is expected to be transmitted in scheduling units (SUs) with different frequencies. There are a number of most important parameters that, if read before disconnecting from the source cell and transmitted in D-BCH blocks, may help reduce latencies. These include: power control parameters in support of inter-cell power control; UL interference if not in the P-BCCH; DL reference signal (RS) transmitted (Tx) power at the neighboring cell for pathloss estimation; load indicator; and the power (Target SINR) gap between serving and non-serving UEs 109. If UL interference, DL reference signal (RS) Tx power and Target SINR are not needed independently but only in the context of an open loop power control algorithm, then they can be more efficiently communication via a single parameter, the common power baseline defined as the sum of these parameters.

RACH parameters of neighboring cells are only needed in the context of a HO. It is assumed that static parameters, such as Zadoff-Chu sequences, location of random access opportunities and low rate varying power control parameters, are forwarded to UE 109 by the serving cell along with the HO command or the HO indication in case of early RACH access. The only fast varying power control parameter the UE 109 would need to read on the D-BCH is the UL interference, if it not in the P-BCCH like the SFN. These parameters are likely to be transmitted with the highest frequency for any of the D-BCH blocks. These parameters can all be bunched together and transmitted in one SU with identical frequencies. Note that a D-BCCH block is transmitted in the DL-SCH.

It might be beneficial for UE 109 to receive RACH responses of message 2 and message 4 from neighboring cells while still connected to the source cell. This permits UE 109 to initiate a RACH access in a neighboring cell without any gaps in the DL reception in the source cell. A RACH access may be initiated to receive timing advance for initiating or maintaining UL synchronization. UL synchronization latencies may be reduced during HO using a RACH access in a neighboring cell without disconnecting from the current cell. UE 109 may or may not be required to initiate RACH accesses in a neighboring cell without disconnecting or causing gaps from the current cell. The protocol may be specified to permit building a UE that can accomplish this without adversely affecting performance. Messages 2 and 4 in the DL RACH responses complete the contention based aspect of RACH. These are thus candidates to be read by UEs in neighboring cells before disconnecting from their current cell.

As noted above there are various different types of information that may be of interest to UE 109 in a neighboring cell. This information is likely to be contained in the SCH, BCH or certain blocks in DL-SCH. In order to read these, the UE also needs to be able to read the L1-L2 control channel. This invention includes formats and structure so that the UE may receive these signals while fully connected to another cell with minimal implementation overhead.

BCH and SCH are generally confined to a bandwidth of 1.25 MHz. This invention does not propose any additional structure or restrictions to these signals. In order to receive these signals while being fully connected to another cell, UE 109 must include additional baseband circuitry that supports the reception of at least a 1.25 MHz duplicate transmission within the same frequency band as the current cell frequency.

The L1-L2 control channel is of interest because it carries allocation for blocks on the DL-SCH. One block of D-BCCH and RACH responses for message 2 and 4 are useful DL-SCH blocks for UE 109 in a neighboring cell to read. In order to read the L1-L2 control channel for allocations for these blocks without added implementation overhead, these allocations are limited to sub-carriers that do not span more than 1.25 MHz. The L1-L2 control channel is expected to span the entire bandwidth of the cell, and within the first few OFDM symbols of the sub-frame. The allocations are also separately coded. While the control channel for a specific allocation may be limited to sub-carriers spanning less than 1.25 MHz bandwidth, it may still be necessary to decode the entire bandwidth to look for the allocation. This invention includes the following to aid in the limiting the decoding to 1.25 MHz. The L1-L2 control channel or equivalently the allocation for the first D-BCCH block is in the first control channel in the overall L1-L2 control channel. The allocation for the RACH messages 2 and 4 is the foremost in the L1-L2 control channel except if an allocation for the first D-BCCH block is present in the same sub-frame. In this case the D-BCCH block is the foremost allocation. Any other DL-SCH blocks that may be read by UEs in neighboring cells are also allocated in the foremost L1-L2 control channels. This allocation restricts the look up and decoding requirement to find the allocation for DL-SCH blocks that carry the information. If UE 109 can decode up to 1.25 MHz of bandwidth in a neighboring cell without gaps, then it can be designed to read the L1-L2 allocations above.

The first D-BCCH block of system information and RACH responses of messages 2 and 4 are carried in DL-SCH. These signals may be of interest to UEs connected in neighboring cells. In accordance with this invention the UE is capable of decoding up to 1.25 MHz of continuous or discontinuous sub-carriers in a neighboring cell in addition to the regular transceiver capability. In order that the UE is capable of reading the relevant DL-SCH blocks, these blocks are restricted to a bandwidth of 1.25 MHz in this invention.

Note that the restriction of 1.25 MHz is related to the already existing limit to the bandspread of the BCH. This restriction only applies to the bandwidth and does not restrict the center frequency of the allocation. It would be advantageous for a UE to be able to decode the BCH in the neighboring cell including decoding all relevant information from the neighboring cell with minimal additional implementation overhead. The required overhead is the additional circuitry required in the UE. The above design facilitates this capability.

In this invention contribution, the E-UTRA protocol is limited so that a UE connected in a current cell can decode some of the transmissions from neighboring cells without gaps and with minimum implementation complexity. In this invention: the synchronization channel and BCH are limited to a bandwidth of 1.25 MHz; the first block in D-BCH and RACH response messages 2 and 4 are transmitted in the limited bandwidth of 1.25 MHz; and the first D-BCH block and the RACH responses separately encode the allocations. These acceptable portions are included in the E-UTRA TS.

Figure 5:
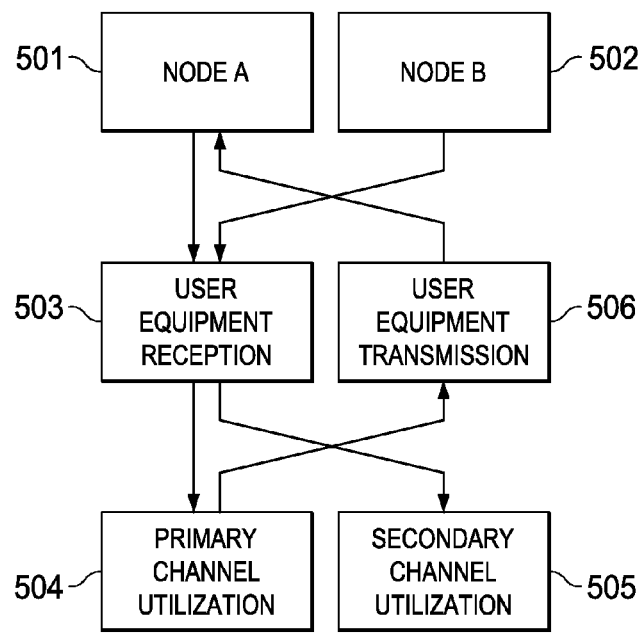
FIG. 5 is a flow chart illustrating operation of this invention.

FIG. 5 is a flow chart illustrating operation of this invention. Node A 501 transmits on the primary base station 101 on the primary channel and includes normal two-way voice and data operations. This is expected to be a synchronous operation. Node B 502 of a neighboring cell such as base station 102 and transmits the secondary data described above. Transmission of these blocks is restricted to a bandwidth of 1.25 MHz as described above. This is expected to be a one-way transmission from base station 102 to UE 109 only and occur on a non-synchronous channel. User equipment reception 503 occurs at the UE 109 using a primary and a secondary baseband channel as described above and further detailed below. User equipment reception 503 supplies data to primary channel utilization 504 and secondary channel utilization 505. FIG. 5 illustrates a return path from primary channel utilization 504 to node A via user equipment transmission 506.

Figure 6:
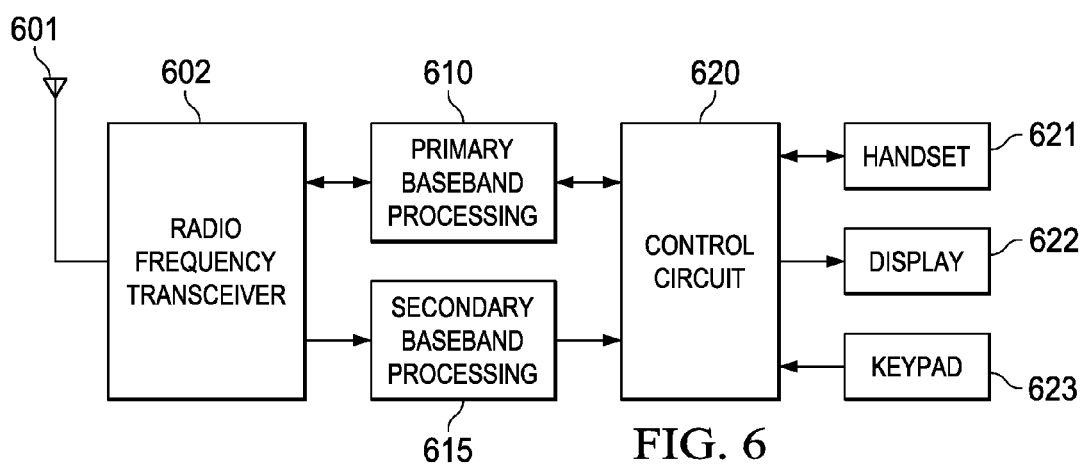
FIG. 6 is a simplified block diagram of user equipment adapted according to this invention.

FIG. 6 is a simplified block diagram of user equipment 109 adapted according to this invention. Radio transmission and reception occur via antenna 601 and radio frequency transceiver 602. Radio frequency transceiver 602 in is two-way communication with primary baseband processing 610. Primary baseband processing 610 supports the normal voice and data transmissions. Primary baseband processing 610 is in two-way communication with control circuit 620. Also coupled to control circuit 620 are handset 621 including a microphone and earphone as known in the art, display 622 and keypad 623 accommodating user input. Radio frequency transceiver 602 also supplied secondary baseband processing 615. As described above, secondary baseband processing 615 processes the data received from neighboring cells. Control circuit 620 uses this secondary data as described above. Secondary baseband processing 615 is simpler than primary baseband processing 510 due to the restrictions on the transmission character.

What is claimed is:

1. A method of periodically broadcasting system information of radio frequency communication between a user equipment and a plurality of base stations, comprising the steps of:
communicating primary data between a primary base station and the user equipment using a primary frequency sub-band having a first bandwidth;
periodically broadcasting system information by each base station about a cell served by the base station using a secondary frequency sub-band having a second bandwidth less than the first bandwidth;
receiving at the user equipment said broadcast information from a primary base station serving the cell including the user equipment using simplified baseband processing relative to said step of communicating between the user equipment and the primary base station; and
receiving at the user equipment said broadcast information from a secondary base station other than the primary base station using simplified baseband processing relative to said step of communicating primary data between the user equipment and the primary base station without gaps in communicating primary data with the primary base station and while remaining fully connected to the primary base station.

2. The method of claim 1, wherein:
said primary data includes two-way voice and data.

3. The method of claim 1, wherein:
said second bandwidth is 1.25MHz.

4. The method of claim 1, wherein:
said step of transmitting data at the secondary base station using a restricted frequency band includes transmitting random access channel parameters.

5. The method of claim 1, wherein:
said step of transmitting data at the secondary base station using a restricted frequency band includes transmitting system numbers.

6. The method of claim 1, wherein:
said step of transmitting data at the secondary base station using a restricted frequency band includes transmitting power control parameters.

7. The method of claim 6, wherein:
said power control parameters include reference signal (RS) transmission power at the secondary base station for pathloss estimation.

8. The method of claim 6, wherein:
said power control parameters include load indicator.

9. The method of claim 6, wherein:
said power control parameters include a power signal to noise ratio gap between serving and non-serving user equipment.

10. The method of claim 1, wherein:
said step of communicating between the secondary base station and the user equipment includes transmitting data at the secondary base station in scheduling units with different frequencies.

11. The method of claim 1, wherein:
said step of communicating between the secondary base station and the user equipment includes using data from said secondary base station at the user equipment to coordinate handoff of the user equipment from the primary base station to the secondary base station.

12. A method periodically broadcasting system information of radio frequency communication between user equipment and a plurality of base stations, comprising the steps of:
communicating primary data between a primary base station and the user equipment via a two-way synchronized channel; and
communicating between at least one secondary base station differing from the primary base station and the user equipment via a one-way non-synchronized channel without gaps in communicating primary data with the primary base station.

13. A user equipment for radio frequency communication between a user equipment and a plurality of base stations, comprising:
an antenna;
a radio frequency transceiver connected to said antenna; and
a baseband processor coupled to said radio frequency transceiver for communicating primary data between a primary base station and the user equipment via a two way synchronized channel, and for communicating between at least one secondary base station differing from the primary base station and the user equipment via a one way non synchronized channel without gaps in communication primary data with the primary base station.

14. The user equipment of claim 13, wherein:
said secondary baseband processor can process a limited bandwidth relative to said primary baseband processor.

* * * * *